(12) United States Patent
Zywiak

(10) Patent No.: US 10,161,783 B2
(45) Date of Patent: Dec. 25, 2018

(54) FLOW SENSOR BIT FOR MOTOR DRIVEN COMPRESSOR

(71) Applicant: Hamilton Sundstrand Corporation, Windsor Locks, CT (US)

(72) Inventor: Thomas M. Zywiak, Southwick, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 190 days.

(21) Appl. No.: 15/096,861

(22) Filed: Apr. 12, 2016

(65) Prior Publication Data

US 2017/0292872 A1 Oct. 12, 2017

(51) Int. Cl.
| | |
|---|---|
| *G01F 25/00* | (2006.01) |
| *B64D 13/06* | (2006.01) |
| *G01F 1/44* | (2006.01) |
| *B64D 1/00* | (2006.01) |
| *G05B 23/02* | (2006.01) |

(52) U.S. Cl.
CPC ........... *G01F 25/0007* (2013.01); *B64D 1/00* (2013.01); *B64D 13/06* (2013.01); *G01F 1/44* (2013.01); *G05B 23/0254* (2013.01)

(58) Field of Classification Search
CPC ....... B64D 1/00; B64D 13/06; G01F 25/0007; G01F 1/44; G05B 23/0254
See application file for complete search history.

(56) References Cited

U.S. PATENT DOCUMENTS

| 6,427,471 | B1 | 8/2002 | Ando et al. | |
|---|---|---|---|---|
| 9,126,687 | B2 | 9/2015 | Zywiak et al. | |
| 9,541,318 | B2 * | 1/2017 | Matsuo | F04D 27/001 |
| 2005/0109123 | A1 * | 5/2005 | Cheesewright | G01F 1/8436 |
| | | | | 73/861.355 |
| 2006/0272385 | A1 * | 12/2006 | Lewis | G01F 25/0007 |
| | | | | 73/1.16 |
| 2013/0060492 | A1 * | 3/2013 | Stabile, Jr. | G01F 25/0007 |
| | | | | 702/45 |
| 2013/0174601 | A1 * | 7/2013 | Matsuo | F04D 27/001 |
| | | | | 62/498 |

(Continued)

FOREIGN PATENT DOCUMENTS

WO  WO 2017061873 A1 *  4/2017  ............. F04D 13/10

OTHER PUBLICATIONS

Andiroglu, Esber, Development of Virtual Air/Water Flow Meters Using Fan/Pump Head and Motor Power, a Dissertation, Aug. 2015, pp. 1-178.

(Continued)

*Primary Examiner* — David A Rogers
(74) *Attorney, Agent, or Firm* — Cantor Colburn LLP

(57) ABSTRACT

According to one embodiment, a computer-implemented method for prognostic for flow sensor is provided. The method includes receiving a first input, the first input related to an input power of a motor for driving a compressor, and receiving a second input, the second input related to a temperature differential of the compressor. The method also includes calculating an estimated airflow based on the first input and the second input, and exporting data associated with the first input, the second input, and the estimated airflow.

13 Claims, 3 Drawing Sheets

(56) References Cited

U.S. PATENT DOCUMENTS

2015/0114078 A1* 4/2015 Shiba ............... G01F 1/667
                                                    73/1.16
2015/0197339 A1   7/2015 Johnson
2017/0045055 A1* 2/2017 Hoefel ............... F04D 1/06

OTHER PUBLICATIONS

Extended European Search Report for EP Application No. 17166209.1-1802, dated Sep. 6, 2017, pp. 1-9.

* cited by examiner

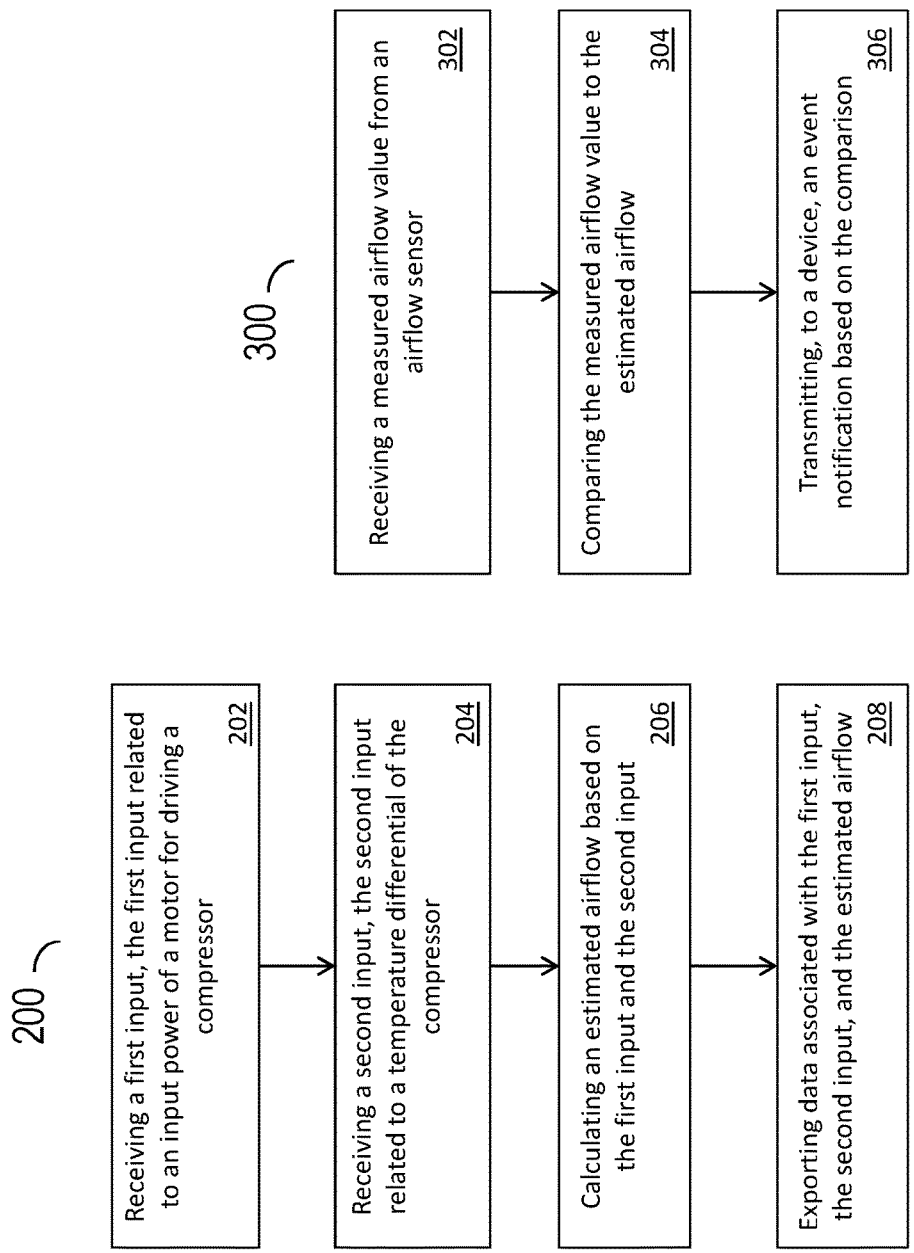

FLOW SENSOR BIT FOR MOTOR DRIVEN COMPRESSOR

BACKGROUND

The present disclosure relates to testing sensor equipment, and more particularly a prognostic for flow sensor bit for motor driven compressor.

Environmental control systems (ECS) are utilized on various types of aircraft for several purposes, such as air supply systems and/or cabin condition systems for the aircraft. For example, components of the ECS may be utilized to remove heat from various aircraft lubrication and electrical systems and/or used to condition aircraft cabin air. The cabin air conditioner includes one or more cabin air compressors (CACs), which compress air entering the system from an outside source or from a ram air system. The compressed air is delivered to an air cycle system and/or a vapor cycle system to bring it to a desired temperature then delivered to the aircraft cabin. After passing through the cabin, the air is typically exhausted to the outside. The CACs may be driven, for example, by air-cooled electric motors.

Pneumatic air conditioning kit (PACK) flow sensors are required to be accurate to +/−6% where failure modes occurring in the sensing hardware can generate unreliable readings. Errors associated with sensor readings can lead to uncertainty of operating points and can further lead to instability of a system. Malfunctioning flow sensors can cause undesirable surges effecting the operation of a compressor, where the surges cause a disruption of the airflow to the compressor. The motors driving these compressors respond to flow sensor readings. High flow sensor readings will cause the motor to throttle back while low flow sensor readings will cause the motor to consume more power while generating excessive airflow. These oscillations lead to inefficiencies in the power used to drive the compressors and further leads to unpredictable airflow from the system.

PACK flow sensors may be equipped with BIT (built-in tests) for determining the operability of the flow sensor, however BIT are unable to detect various failures modes such as those failures that generate high flow readings which can induce a CAC surge. Another technique for detecting malfunctioning flow sensors requires using a redundant flow sensor configuration to determine a sensor drift between sensors. However, the redundant configuration increases the cost of operation and maintenance and further increases the processing and complexity of the system

BRIEF DESCRIPTION

According to one embodiment, a computer-implemented method for a prognostic for flow sensor BIT for a motor driven compressor is provided. The method includes receiving a first input, the first input related to an input power of a motor for driving a compressor, and receiving a second input, the second input related to a temperature differential of the compressor. The method also includes calculating an estimated airflow based on the first input and the second input, and exporting data associated with the first input, the second input, and the estimated airflow.

According to another embodiment, a system for performing a prognostic for a flow sensor BIT for a motor driven compressor is provided. The system includes a flow sensor and a compressor driven by a motor. The system is configured to receive a first input from a motor controller providing a signal to the motor and receive a second input from a temperature sensor equipment, the second input related to a temperature differential of the compressor. The system is also configured to calculate an estimated airflow based on the first input and the second input, and export data associated with the first input, the second input, and the estimated airflow.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 2 is a flow diagram illustrating a method of operating a flow sensor BIT for a motor driven compressor according to an embodiment;

FIG. 3 is a flow diagram illustrating a method of operating a flow sensor BIT for a motor driven compressor according to another embodiment.

DETAILED DESCRIPTION

Figure 1:
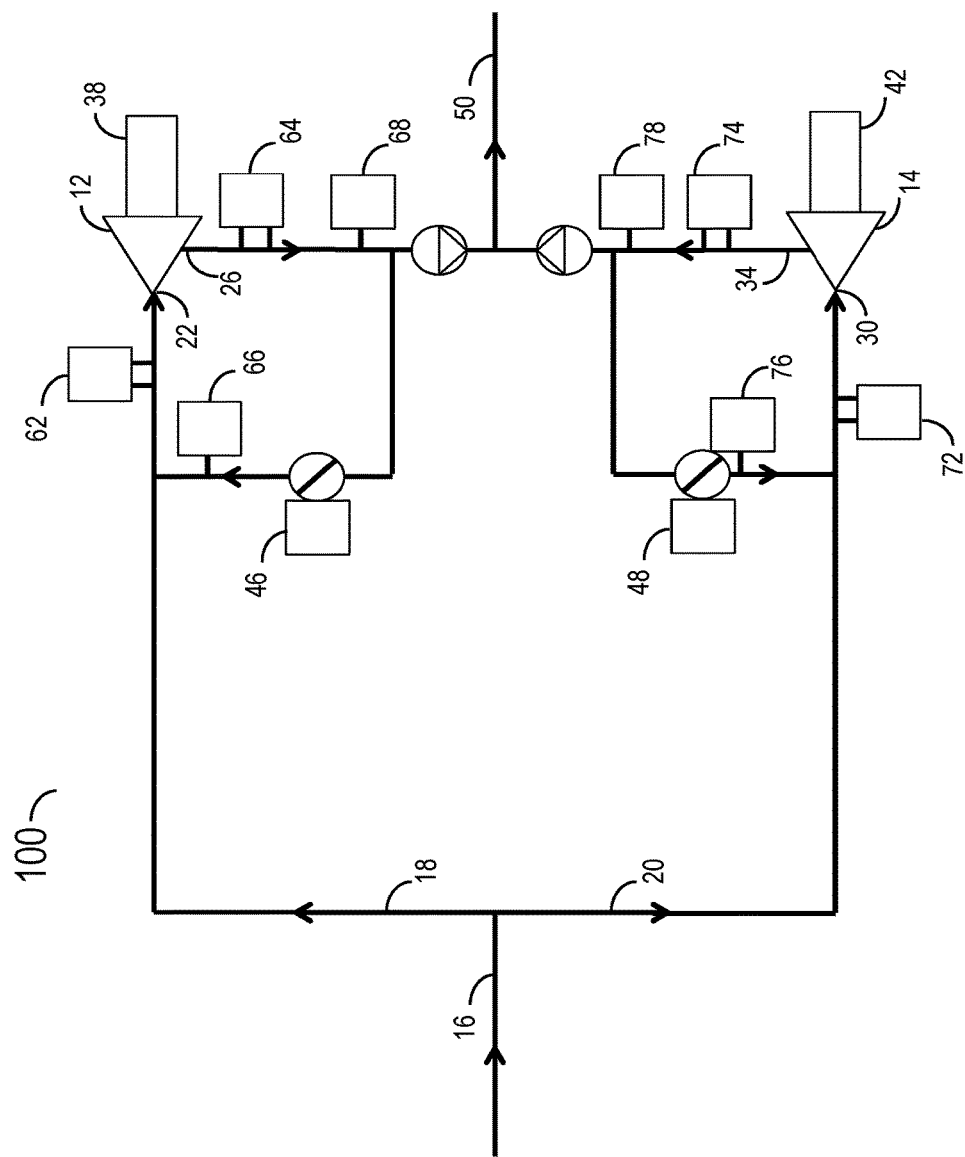
FIG. 1 is a schematic illustration of a parallel compressor system in accordance with a flow sensor BIT for a motor driven compressor.

Referring to FIG. 1, an environmental control system (ECS) is schematically illustrated and referred to by numeral 100. The ECS 100 is configured to condition air for various environments, such as an aircraft cabin. It is envisioned, however, that the ECS 100 may be used to condition numerous other environments and is not limited to use in the aircraft context.

The illustrated ECS 100 includes a plurality of cabin air compressors (CACs). In the illustrated embodiment, theses CACs are shown as a first compressor 12 and a second compressor 14 and are operating in parallel. A main inlet airflow 16 is supplied via a source, such as an external source or provided internally by a ram air system, for example. The main inlet airflow 16 is diverted into two paths, resulting in a first flow 18 and a second flow 20 toward the first compressor 12 and the second compressor 14, respectively.

The first flow 18 enters the first compressor 12 via a first compressor inlet 22 at a first inlet temperature and exits the first compressor 12 via a first compressor outlet 26 at a first outlet temperature, traveling through the first compressor 12 at a first flow rate (i.e., compressor 12 fluidly directs the first flow 18 from the input 22 to the output 26). Similarly, the second flow 20 enters the second compressor 14 via a second compressor inlet 30 at a second inlet temperature and exits the second compressor 14 via a second compressor outlet 34 at a second outlet temperature, traveling through the second compressor 14 at a second flow rate (i.e., compressor 14 fluidly directs the second flow 20 from the input 30 to the output 34).

The first compressor 12 and the second compressor 14 are driven by a first motor 38 at a first input power and a second motor 42 at a second input power, respectively. The ECS 100 also includes at least one add heat valve (AHV), such as a first AHV 46 and a second AHV 48. The first AHV 46 is configured to recirculate air from a region proximate the first compressor outlet 26 to a region proximate the first compressor inlet 22, based on operational needs. Similarly, the second AHV 48 is configured to recirculate air from a region proximate the second compressor outlet 34 to a region proximate the second compressor inlet 30. Subsequent to passing through the first compressor 12 and the second compressor 14, the first flow 18 and the second flow 20 are directed to an air distribution system (not illustrated) either independently, or in combination, such as in a main outlet airflow 50, which is directed downstream to an air cycle system and/or a vapor cycle system, for example.

An inlet airflow temperature sensor 62 is coupled to first flow 18 to measure the airflow temperature entering the first compressor 12. An outlet airflow temperature sensor 64 is coupled to the first compressor outlet 26 to measure the airflow temperature as it leaves the first compressor 12. Also coupled to the first compressor outlet 26 is an output pressure sensor 68 for measuring the airflow pressure leaving the first compressor outlet 26. A second pressure sensor 66 is coupled to the path after the AHV 46 to measure the airflow pressure. Additionally, an inlet airflow temperature sensor 72 is coupled to second flow 20 to measure the airflow temperature entering the second compressor 14. An outlet airflow temperature sensor 74 is coupled to the second compressor outlet 34 to measure the airflow temperature as it leaves the second compressor 14. Also coupled to the second compressor outlet 34 is an output pressure sensor 78 for measuring the airflow pressure leaving the second compressor outlet 34. A second pressure sensor 76 is coupled to the path after the AHV 48 to measure the airflow pressure.

Referring now to FIG. 2, a method 200 for performing a diagnostic for a flow sensor BIT (built-in test) for a motor driven compressor is shown. Block 202 provides receiving a first input, the first input related to an input power of a motor for driving a compressor. In an embodiment, a motor controller (not shown), such as a CMSC (common motor starter controller) provides a signal to control the input power to a motor coupled to a compressor. A general controller (or processor) can receive the input power supplied by the motor controller. Block 204 includes receiving a second input, the second input related to a temperature differential of the compressor. In an embodiment, an inlet airflow temperature is measured by an inlet airflow temperature sensor located at an input to the compressor, and an outlet airflow temperature is measured by an outlet airflow temperature sensor located at an output of the compressor. The temperature differential represents the difference between the inlet airflow temperature and the outlet airflow temperature. The general controller can receive the second input which is the temperature differential.

Block 206 provides calculating an estimated air flow based on the first input and the second input. In an embodiment, an AHM (air health management) calculation is performed by a general controller to estimate airflow. The calculation is provided as follows.

Flow per CAC (lb/min)=CAC power $(W)/((CAC\ Tout-TAT) \times k)$

TAT=Static Air Temperature $\times (1+0.2 \times Mach^2)$

CAC power—Cabin Air Compressor power; CAC Tout—Cabin Air Compressor Temperature output; TAT—total air temperature; k—constant determined by component (motor, motor controller) efficiencies.

Block 208 provides exporting data associated with the first input, the second input, and the estimated airflow. In an embodiment, the data received and calculated by the general controller can be stored in a memory and/or exported to a device. As a non-limiting example, the device can be a display, computer device, or external memory or device.

Now referring to FIG. 3, a method 300 in accordance with a further embodiment is shown. Block 302 provides receiving a measured airflow value from an airflow sensor. It is known to one of ordinary skill in the art the airflow sensor can be any type of airflow sensor such as a Venturi flowmeter. In an embodiment, a general controller (or processor) receives the measured airflow value from a sensor mounted to an aircraft. Block 304 includes comparing the measured airflow value to the estimated airflow.

Block 306 further provides transmitting, to a device, an event notification based on the comparison. In an embodiment, the event notification is an indication of a malfunctioning airflow sensor performing the measurement. In one embodiment, an error margin of +/−15% is used for determining a malfunctioning airflow sensor when comparing the measured airflow with the estimated airflow. If an error results outside of the error margin an event notification is transmitted to a device. In a different embodiment, data corresponding to the first input, second input, estimated airflow, and measured airflow for a configurable time period is stored and/or exported to an internal or external device. In an embodiment, this data can be provided to flight crews in real-time or provided at configured intervals. In one embodiment, the data can be downloaded and post-processed. In another embodiment, the data may be collected and processed for a configurable time period.

Figure 4:
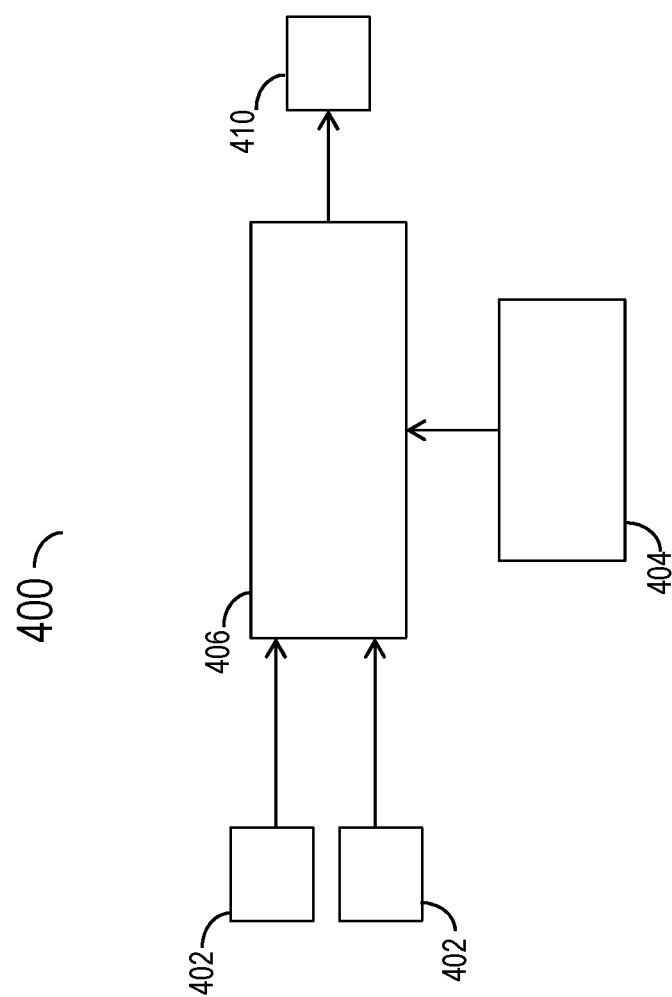
FIG. 4 is a schematic illustration of a system of operating a flow sensor BIT for a motor driven compressor according to an embodiment.

Now referring to FIG. 4, an embodiment of a system 400 of operating a flow sensor BIT for a motor driven compressor is provided. The general controller 406 is configured to receive and process a plurality of data and is further configured to transmit the received input data and processed data. Airflow temperature sensors 402 of a compressor provide airflow temperature information to the general controller 406 that determines a temperature differential of the compressor using the inlet and outlet airflow temperatures from the temperature sensors 402. The motor controller 404 transmits the power value supplied to the motors used to drive the associated compressors. The general controller 406 is further configured to implement the AHM calculation provided above using the received input from temperature sensors 402 and the motor controller 404 to estimate an airflow. The general controller 406 is capable of comparing the measured airflow to the estimated airflow and can further transmit the received inputs and processed data to an external/internal device 410 for storage or further processing.

Collecting cruise data, which requires in-flight testing, can allow for reliable temperature and pressure readings. The compressor will reach a study temperature and the pressure of the air at a cruising altitude will likely be more constant. In addition, the AHV are likely to be closed where modulating heat valves can substantially affect the temperature readings provided by the sensors. When the AHVs are open, airflow external to the aircraft is allowed to enter the system and enter the compressor introducing variations due to fluctuations in the ambient airflow temperature. Therefore, the highest cruising altitudes will increase the probability of the AHVs being closed to provide reliable readings. Ground taxi data, data collected as the aircraft is taxiing on the runway, can suffer as the AHVs are likely to be open due to the cooler ambient temperatures causing a variation in airflow temperature readings. In a different embodiment, the estimation comprises compensating the first and second input according to a modulation of an AHV, where the AHV provides at least a portion of the flow from a region proximate a first compressor outlet to a region proximate a first compressor inlet.

A benefit realized by the disclosure provides for a reduction in CAC surges by responding to properly functioning flow sensors leading to efficient operation of the system. In addition, a technique for identifying defective flow sensors requiring maintenance is provided. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A computer-implemented method for prognostic for flow sensor, the method comprising:
   receiving a first input, the first input related to an input power of a motor for driving a compressor;
   receiving a second input, the second input related to a temperature differential of the compressor, wherein the second input is collected during in-flight testing;
   calculating an estimated air flow based on the first input and the second input;
   exporting data associated with the first input, the second input, and the estimated airflow;
   receiving a measured airflow value from a flow sensor; and
   comparing the measured airflow value to the estimated airflow, wherein the estimated airflow is based at least in part on compensating the first and second input according to a modulation of an add-heat valve.

2. The method of claim 1, wherein the first input is a power supplied to the motor driving a compressor.

3. The method of claim 1, wherein the second input is a temperature differential of an inlet airflow temperature of the compressor and an outlet airflow temperature of the compressor.

4. The method of claim 1, further comprising transmitting to a device, an event notification based the comparison.

5. The method of claim 4, wherein the event notification indicates an error, and wherein the transmitting the event notification is responsive to exceeding an error margin.

6. The method of claim 1, further comprising exporting data corresponding to the first input, the second input, the estimated airflow, and the measured airflow over a specified time period.

7. A system for performing a prognostic for a flow sensor, the system comprising:
   a flow sensor;
   a compressor driven by a motor;
   the system configured to:
      receive a first input from a motor controller providing a signal to the motor;
      receive a second input from a temperature sensor equipment, the second input related to a temperature differential of the compressor, wherein the second input is collected during in-flight testing;
      calculate an estimated airflow based on the first input and the second input;
      export data associated with the first input, the second input, and the estimated airflow;
      receive a measured airflow value from a flow sensor; and
      compare the measured airflow value to the estimated airflow, wherein the estimated airflow is based at least in part on compensating the first and second input according to a modulation of an add-heat valve.

8. The system of claim 7, wherein the first input is a power supplied to the motor driving a compressor.

9. The system of claim 7, wherein the second input is a temperature differential of an inlet airflow temperature of the compressor and an outlet airflow temperature of the compressor, where the inlet airflow temperature is measured by an inlet airflow temperature sensor and the outlet airflow temperature is measured by an outlet airflow temperature sensor.

10. The system of claim 7, further comprising transmit to a device, an event notification based the comparison.

11. The system of claim 10, wherein the event notification indicates an error, and wherein the transmitting the event notification is responsive to the comparison exceeding an error margin.

12. The system of claim 7, further comprising exporting data corresponding to the first input, the second input, the estimated airflow, and the measured airflow over a specified time period.

13. The system of claim 7, wherein the flow sensor is a Venturi flow meter.

* * * * *